(12) United States Patent
Geise

(10) Patent No.: US 10,906,220 B2
(45) Date of Patent: Feb. 2, 2021

(54) METHOD FOR PRODUCING A LUMINESCENT 3D RADAR MODULE COVER, AND INJECTION-MOLDING SYSTEM

(71) Applicant: Robert Bosch GmbH, Stuttgart (DE)

(72) Inventor: Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 389 days.

(21) Appl. No.: 15/879,848

(22) Filed: Jan. 25, 2018

(65) Prior Publication Data
US 2018/0215086 A1 Aug. 2, 2018

(30) Foreign Application Priority Data
Feb. 2, 2017 (DE) .................. 10 2017 201 660

(51) Int. Cl.
*B29C 45/14* (2006.01)
*B29C 45/16* (2006.01)
(Continued)

(52) U.S. Cl.
CPC .. *B29C 45/14811* (2013.01); *B29C 45/14336* (2013.01); *B29C 45/14467* (2013.01);
(Continued)

(58) Field of Classification Search
CPC .... B29C 2045/0093; B29C 2045/1673; B29C 45/14336; B29C 45/14467;
(Continued)

(56) References Cited

U.S. PATENT DOCUMENTS

| | | | | |
|---|---|---|---|---|
| 2,764,565 A | * | 9/1956 | Hoppe | B01J 19/26 521/172 |
| 5,439,634 A | * | 8/1995 | North | B29C 45/1769 264/161 |

(Continued)

FOREIGN PATENT DOCUMENTS

| | | |
|---|---|---|
| DE | 19819709 C2 | 5/2000 |
| DE | 10338506 B4 | 11/2006 |

(Continued)

OTHER PUBLICATIONS

WO2015055371A1—Machine Translation (Year: 2015).*

*Primary Examiner* — Matthew J Daniels
*Assistant Examiner* — Yunju Kim
(74) *Attorney, Agent, or Firm* — Norton Rose Fulbright US LLP; Gerard Messina

(57) ABSTRACT

A method and a system for producing a luminescent 3D radar-module cover for a radiator grille of a motor vehicle. A three-dimensional structure including an optical conductor is produced from a light-dispersing first plastic material in separate method steps using a first injection mold. The three-dimensional structure is metallized and metal-coated. A subsequent separation of the gating takes place. A cover element is produced from a second plastic material using a second injection mold, which at least partially covers the metallized three-dimensional structure in a planar manner in a position of use. A contour of the three-dimensional structure is left free. The gating is subsequently severed. The three-dimensional structure is metallized together with the cover element disposed thereon and is embedded in a third plastic material with the aid of a third injection mold while molding a mount for a radar module and fastening points on the molded component.

15 Claims, 5 Drawing Sheets

(51) Int. Cl.
  *B29C 45/00*  (2006.01)
  *H01Q 1/42*  (2006.01)
  *H01Q 1/32*  (2006.01)
  *F21S 43/14*  (2018.01)
  *B60Q 1/50*  (2006.01)
  *B60Q 1/26*  (2006.01)
  *B29L 31/34*  (2006.01)
  *F21S 43/16*  (2018.01)
  *B60Q 1/28*  (2006.01)

(52) U.S. Cl.
  CPC ........... *B29C 45/1671* (2013.01); *H01Q 1/42* (2013.01); *B29C 45/14631* (2013.01); *B29C 45/14639* (2013.01); *B29C 2045/0093* (2013.01); *B29C 2045/1673* (2013.01); *B29K 2995/0026* (2013.01); *B29L 2031/3456* (2013.01); *B60Q 1/2661* (2013.01); *B60Q 1/28* (2013.01); *B60Q 1/50* (2013.01); *F21S 43/14* (2018.01); *F21S 43/16* (2018.01); *H01Q 1/3233* (2013.01); *H01Q 1/3283* (2013.01)

(58) Field of Classification Search
  CPC ........ B29C 45/14631; B29C 45/14639; B29C 45/14811; B29C 45/1671; H01Q 1/3233; H01Q 1/3283; H01Q 1/42; Y10S 425/051
  USPC ......................................................... 264/259
  See application file for complete search history.

(56) References Cited

U.S. PATENT DOCUMENTS

2017/0324157 A1* 11/2017 Shurish .................... H01Q 1/44
2018/0250856 A1* 9/2018 Watanabe ................. G01S 7/03
2019/0356046 A1* 11/2019 Mayer Pujadas .... H01Q 1/3233

FOREIGN PATENT DOCUMENTS

DE  102008048765 A1  3/2010
WO  WO-2015055371 A1 *  4/2015  ............. C03C 17/06

* cited by examiner

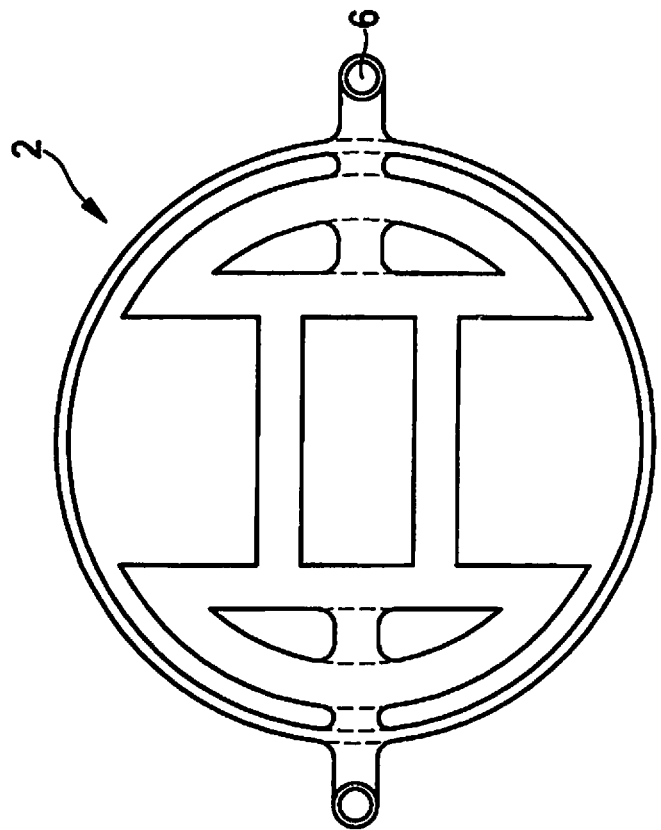
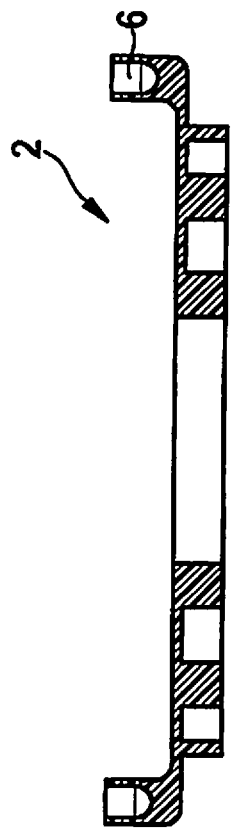
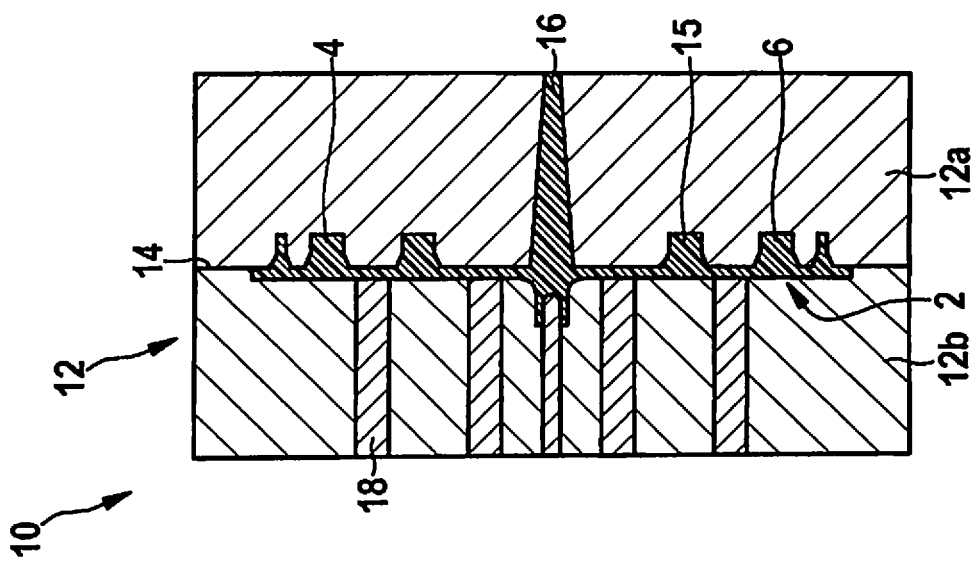
Fig. 1b
Fig. 1c
Fig. 1a

METHOD FOR PRODUCING A LUMINESCENT 3D RADAR MODULE COVER, AND INJECTION-MOLDING SYSTEM

CROSS REFERENCE

The present application claims the benefit under 35 U.S.C. § 119 of German Patent Application No. DE 102017201660.4 filed on Feb. 2, 2017, which is expressly incorporated herein by reference in its entirety.

FIELD

The present invention relates to a method for producing a luminescent 3D radar-module cover, which is meant to be placed in the area of a radiator grille of a motor vehicle. In addition, the present invention also pertains to an injection-molding system for producing luminescent 3D radar-module covers.

BACKGROUND INFORMATION

At present, 3D radar-module covers for an installation on a radiator grille of a motor vehicle require many complex process steps, which is why only a few companies are slowly beginning to use them to any significant extent.

Their costly and time-consuming production is attributable in particular to the high demands on the "transparency" of the cover to radar waves, which is indispensable for the functionality of an adaptive cruise control, for instance. In this context, it is described in German Patent Nos. DE 19819709 C2 and DE 10338506 B4, for example, that no air inclusions must be present between the plastic layers. In addition, only layers of indium, tin or gold are to be used as metallic layers in order not to interfere with the radar waves.

When examining current covers from a series production, it becomes clear that the 3D structure is produced in an injection-compressed plastic disk, which is made from a thermoplast such as a polycarbonate (PC) that is transparent to radar waves. Without an additional cross-linked varnish layer, the plastic disk would quickly be scratched when struck by stones. For this reason, the very thin polyurethane layer is applied in an additional process step, as it is done in the case of headlight covers.

For an additional charge, company symbols of a vehicle, for example, are also offered with background lighting in order to illuminate the central component from the sides. However, electronic components and circuit traces must be integrated into the region for such a purpose, which interfere with the function of the radar module, which is why the radar functionality has to be omitted in versions featuring an illuminated logo, for example.

In darkness or when soiled, the trademarks with a radar module installed behind them may not always be recognizable.

On the other hand, optical-fiber technology is used in vehicle headlights, for example, in order to couple in light at a particular location and to conduct it via a defined optical design. A corresponding technique is described in German Patent Application No. DE 102008048765 A1, for instance. In order to mount the standard radar module actually provided for the respective task behind the cover on the vehicle, an additional plastic mount is installed in order to keep the module in position in a stable and precise manner. However, the dimensions of the thermoplastic mount may vary under the influence of temperature fluctuations or media.

SUMMARY

It is an object of the present invention to provide a simpler and cost-effective production of optically high-quality radar-module covers including reflecting and luminescent 3D structures that can be clearly seen even when soiled or when it is dark. The covers should be able to be produced using the fewest process steps possible and nevertheless satisfy the high demands of the radar sensor with regard to radar-wave transparency. At the same time, the cover must be scratch-resistant and protect the shiny company symbol from the environmental influences at the central installation location of the radiator grille for as long as possible. In addition, a mechanically rigid and thermally stable mount is to be integrated on the rear side of the cover or the 3D structure, so that a standard radar module is able to be installed and remain in the precise position on a permanent basis.

In accordance with an example embodiment of the present invention, a method is provided in which A three-dimensional structure having at least one optical conductor is produced from a light-dispersing first plastic material with the aid of a first injection mold;

The three-dimensional structure is metallized and metal-coated, whereupon the gating is severed;

A cover element is produced, which at least partially covers the three-dimensional structure in a planar manner in the position of use, and on which the contour of the three-dimensional structure is left free, i.e. using a second plastic material and a second injection mold with subsequent severing of the gating;

The metallized three-dimensional structure together with the cover element disposed thereon is embedded in a third plastic material with the aid of a third injection mold, while a mount for a radar module and a plurality of fastening points are molded on the molded component at the same time.

Therefore, in accordance with an example of the present invention, a radar-module cover having a luminescent 3D structure is produced with the aid of said method at a high optical quality and simultaneously cost-effectively, using a small number of process steps. A mirror surface is additionally produced by the metallization. The company symbol imaged by the 3D structure, for instance, is displayed in luminescent form, e.g., in the central area of the radiator grille, even when soiled and in darkness; furthermore, and because of the lateral incoupling of light, the company symbol will not interfere with the method of functioning of the radar module. The three-dimensional structure may have an essentially planar form, for example, from which elements project in the direction of the normal, so that a company symbol in the form of a raised 3D structure, for instance, is conceivable.

Also possible in this context, for example, is that the luminescent cover is also able to indicate signals or operating states to the vehicle driving ahead, if a direct connection to the radar module exists. Since the production requires fewer method steps than in current series applications without illumination, for instance, error sources such as air inclusions or coating errors are no longer an issue.

The use of cross-linking transparent plastic materials as a complete encapsulation protects the external surface from environmental effects by a duroplastic protective coating and saves a labor-intensive varnishing process.

Additional advantageous variants of the method according to the present invention are described herein.

In one advantageous variant of the method according to the present invention, a thermoplastic plastic material, in particular a transparent thermoplastic plastic material, may be used as the first plastic material for producing the three-dimensional structure having the at least one optical conductor, so that light emitted by a light source is easily able to pass through it.

In one further development, the optical conductor of the 3D structure may be produced in a separate injection-molding process from a transparent polymethyl methacrylate (PMMA), a polycarbonate (PC) or a polysiloxane (silicone) as the plastic material, which is adjustable, or adjusted, in a special light-dispersing fashion in each case. The first plastic material may thus be an acrylic glass, for instance. Here, the light is able to be introduced from the side via LEDs, for instance, so that no electronic components or circuit traces lie in front of the radar module, and the incoupling therefore takes place with little or no interference in an advantageous manner.

In a particularly preferred manner, in one further variant of the present method, the three-dimensional structure having the at least one optical conductor may for this purpose be provided and set up with at least one receptacle. Disposed on this receptacle in the position of use is at least one light source, preferably at least one LED, which is connected to the optical conductor. In this way the 3D structure is easily able to be induced to light up with the aid of the optical conductor which is developed together with it.

Another variant of the method according to the present invention, the three-dimensional structure is metallized using a metal that allows radar waves to pass through, in particular using indium, tin or gold, so that radar waves are easily able to pass through the applied layer of evaporated metal. For this purpose, the 3D structure previously produced during the first production step was molded so as to exhibit a very slight roughness so that the structure is now able to be completely metallized and metal-coated in the current step.

To ensure the passage of light through the evaporated layer on the three-dimensional structure, a further advantageous variant of the present method provides that the layer thickness amounts to between 20 and 50 nm, since a greater thickness no longer permits the passage of light. As a result, the metal layer disposed on the structure is so thin that it reflects toward the front but still allows the light from the optical conductor to pass through.

Excellent handling properties of the three-dimensional structure during the metallization step are offered by one variant of the present invention. Here, the three-dimensional structure is formed in the first injection mold as a molded part having a gating, in particular a rod-type gating, which is used as a retaining means during the metallization process. Once the metallization has been concluded, the gating can be mechanically severed from the molded part so that it will not interfere subsequently.

In one further advantageous variant of the method according to the present invention, the cover element is molded in a separate injection mold, for instance in the form of a cover disk in which the contour of the three-dimensional structure has been left open, together with the optical conductor. Accordingly, the cover element is produced in the second injection mold from a thermoplastic plastic material, in particular from an initially basically transparent PMMA, or from a plastic material having adjustable properties, a polymer blend. Here, too, the gating that is created may again be subsequently mechanically severed.

In one preferred further development, the polymer blend may be formed by a blend of a polycarbonate together with a thermoplastic terpolymer, in particular an acrylonitrile butadiene styrole copolymer (ABS), or together with a polyester, in particular with polybutylene terephthalate. The first blend is easily able to be coated and exhibits excellent resistance to atmospheric conditions and ageing, while the latter in particular has an advantageous cooling behavior.

To allow for a display of structures in a manner that is rich in contrasts and in particular uses different color components, in one variant of the present method a molten mass of the base material(s) used for producing the cover disk is advantageously dyed using at least one dye material that is transparent to radar waves, in particular using color pigments or dye. When pigments are used as a coloring substance, they are present in the molten mass in undissolved form and are preferably developed to be migration-stable, so that the coloring does not change over time. The coloring may be accomplished using a wide variety of different color pigments, but pigments for effect (pearl luster, metallic effect or similar effects), possibly in combination, are possible as well.

In order to be able to accommodate the packet made up of the cover element and the three-dimensional structure on all sides in a type of protective layer, and to simultaneously develop a mount for a radar module including fastening means, the component produced during the third injection-molding process is expediently provided with undercuts. For this reason, in one further variant of the method according to the present invention, at least one pusher, which may be a cross pusher, is provided and set up on the third injection mold during the embedding in the third plastic material. Pushers generally generate additional unmolding directions during the molding process. A thermoplastic polymer, in particular a layer or an insert of Teflon (PTFE), is advantageously positioned on its surface region facing the three-dimensional structure, in which polymer retaining and fixation bores are in turn introduced, into which the metallized 3D structure with the optical conductor is placed together with the cover element. After the cross pusher is laterally retracted and the injection mold is closed, the components for the third plastic material are injected via the mixing head.

In one preferred variant of the present method, which produces a stable end product that has a smooth surface which makes an additional protective layer superfluous, the third plastic material is formed by a cross-linking varnish, in particular a transparent, cross-linking varnish, in which the three-dimensional structure and the cover element disposed thereon are completely embedded.

For this purpose, the cross-linking varnish is developed from a synthetic resin in one preferred further development, in particular a transparent synthetic resin such as polyurethane, or an elastomer, such as polyurea. Polyurethanes not only have variability both with regard to their cross-linking as such and their tightly knit structure, but also offer excellent electrical insulation and resistance to atmospheric effects, while polyuria is insensitive to moisture, stable and also durable.

To manufacture reproducible and precise finished products of identical shape, one advantageous variant of the method according to the present invention may include injecting the cross-linking varnish into the third injection mold at an internal pressure of the mold that is less than 50 bar, thereby subjecting the injection mold with its closing unit only to slight deformations, so that what is known as mold breathing will have no effect on the molding process. In a similar context, the third plastic material is able to be cross-linked at a mold temperature in a range between 70° C. and 100° C. in order to produce a mechanically rigid and thermally stable mount for the exact positioning of the radar module, the result of which is the generation of reliable measured values during use.

After the component has been produced, the radar module with the sealing cap is able to be slipped into the produced mount in the direction of the encapsulation and can held in place via two or more locking catches on the component of the module housing, which thereby likewise forms a type of module housing. Then, the LEDs are able to be laterally fastened in the receptacles and the complete radome be mounted using the fastening points, such as screw-fitting locations, on the radiator grille.

The aforementioned objective may also be achieved in accordance with the present invention by an injection-molding system for producing luminescent 3D radar-module covers, having a metallization unit, at least one gating-severing device, and a plurality of injection molds. Using a first light-dispersing plastic material, a first injection mold forms a three-dimensional structure, which includes at least one optical conductor. A second injection mold uses a second plastic material to form a cover element, which at least partially covers the three-dimensional structure in a planar manner in the position of use and on which the contour of the three-dimensional structure has been left open. After the three-dimensional structure has been metallized with the aid of the metallization device, a third injection mold embeds the 3D structure together with the cover element disposed thereon in a third plastic material, and a mount for a radar module as well as a plurality of fastening points are molded in addition.

This system is suitable, intended and set up in particular for executing a method as described above, so that reference is made to the above comments as far as the functionalities of the individual components are concerned.

The above developments and further refinements may be combined with one another in any desired manner. Additional possible developments, further refinements and implementations of the present invention also include combinations of features of the present invention not explicitly mentioned previously or described below in connection with the exemplary embodiments. In particular, one skilled in the art will also add individual aspects as improvements or supplementations to the respective basic form of the present invention.

Below, the present invention is described in greater detail in the figures on the basis of exemplary embodiments.

BRIEF DESCRIPTION OF THE DRAWINGS

FIG. 1a-c shows a sectional side view (FIG. 1a) of a first injection mold with a three-dimensional structure including an optical conductor situated therein, a planar top view (FIG. 1b) of the three-dimensional structure, and a sectional side view of the structure including the optical conductor from FIG. 1b in a side view, produced according to a first variant of the present method.

DETAILED DESCRIPTION OF EXAMPLE EMBODIMENTS

Figure 2B:
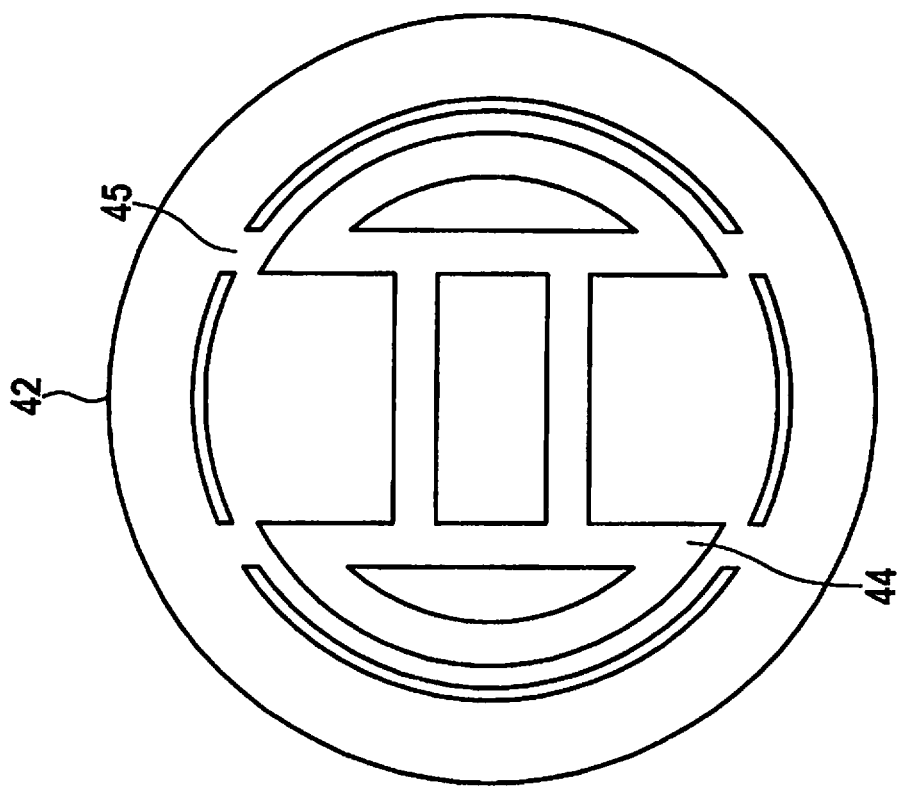
FIG. 2a, b show a sectional side view (FIG. 2a) of a second injection mold with a cover element situated therein, and a planar top view (FIG. 2b) of the cover element with a contour of the three-dimensional structure left open, produced according to one further variant of the present method.

Identical or functionally equivalent elements and devices have been provided with the same reference numerals unless otherwise noted.

In a general view, different sub-steps of the method according to the present invention, and the injection-molding system are illustrated in FIGS. 1 through 5 with the aid of schematic diagrams.

FIGS. 1a-c shows an illustration of the method step of producing three-dimensional structure 2 together with at least one light conductor 4 from a light-dispersing first plastic material with the aid of a first injection mold 10. FIG. 1a shows three-dimensional structure 2 in the form of a molded part of this method step lying in injection mold 10; three-dimensional structure 2 forms a disk-shaped contour, which can be seen more readily in the planar top view in FIG. 1b and in the side view of FIG. 1c. There, structure 2 is seen as a transparent body, which has receptacles 6 for light sources 8 (not yet shown here) on two ends lying opposite from each other. Casting mold 12, which can be subdivided into a gating side 12a and an ejector side 12b at separation plane 14, is visible on first injection mold 10. Accordingly, a rod-type gating 16 is shown in the illustration of FIG. 1a. In addition, a plurality of ejectors 18, which are situated on top of one another and point in the direction of the gating side, are visible on ejecting side 12b. Ejectors 18 are used for releasing three-dimensional structure 2, whose raised regions are molded in mold cavities 15 of the gating side, from ejector side 12b following the first injection-molding process.

Figure 2A:
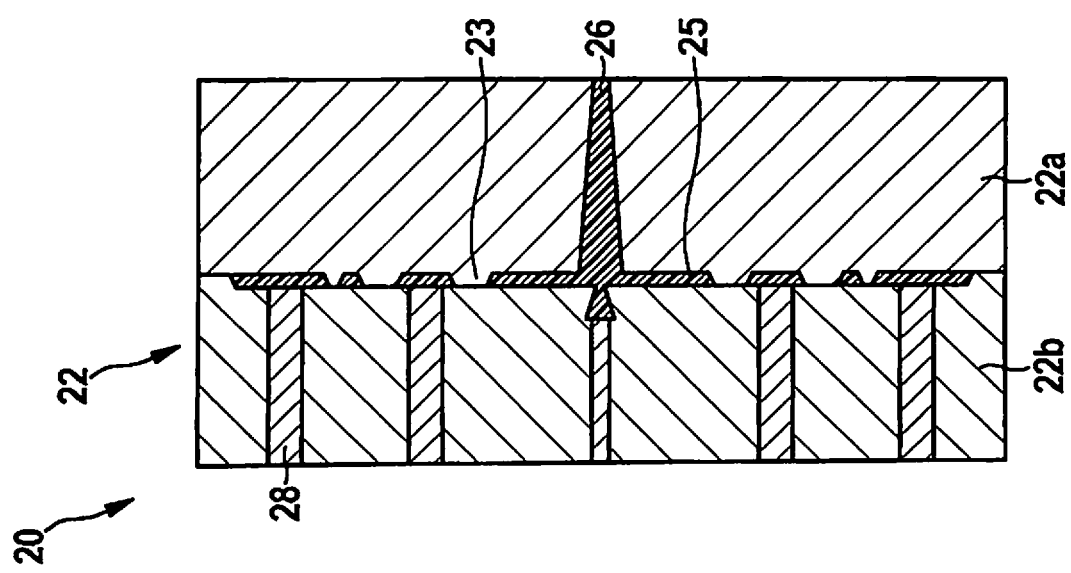

The production of cover element 42, which subsequently at least partly covers three-dimensional structure 2 in a planar manner in the position of use, is carried out in a separate second injection mold 20, shown in FIG. 2a. Left open on cover element 42, which is visible in a top view in FIG. 2b, is the contour of three-dimensional structure 2 with cutout 44. Cover element 42 is produced from a second plastic material with the aid of second injection mold 20, including the subsequent severing of gating 26. A separation plane, which separates gating side 22a and ejector side 22b, can also be seen on second injection mold 20. Cover element 42, which is situated in casting mold 22 in FIG. 2a, is essentially molded in a mold cavity 25 of ejector side 22b, while projections 23 leave room for the contour of three-dimensional structure 2 for its coverage by cover element 42. Once again, ejectors 28 ensure that cover element 42 is able to be released from ejector side 22b of casting mold 22. In addition, another rod-shaped gating 26 can be seen, along whose extension the second plastic material is injected into casting mold 22. At coverage points 45, cover element 42 at least partially covers three-dimensional structure 2 or 2' in the position of use (not shown in FIG. 2).

Figure 3:
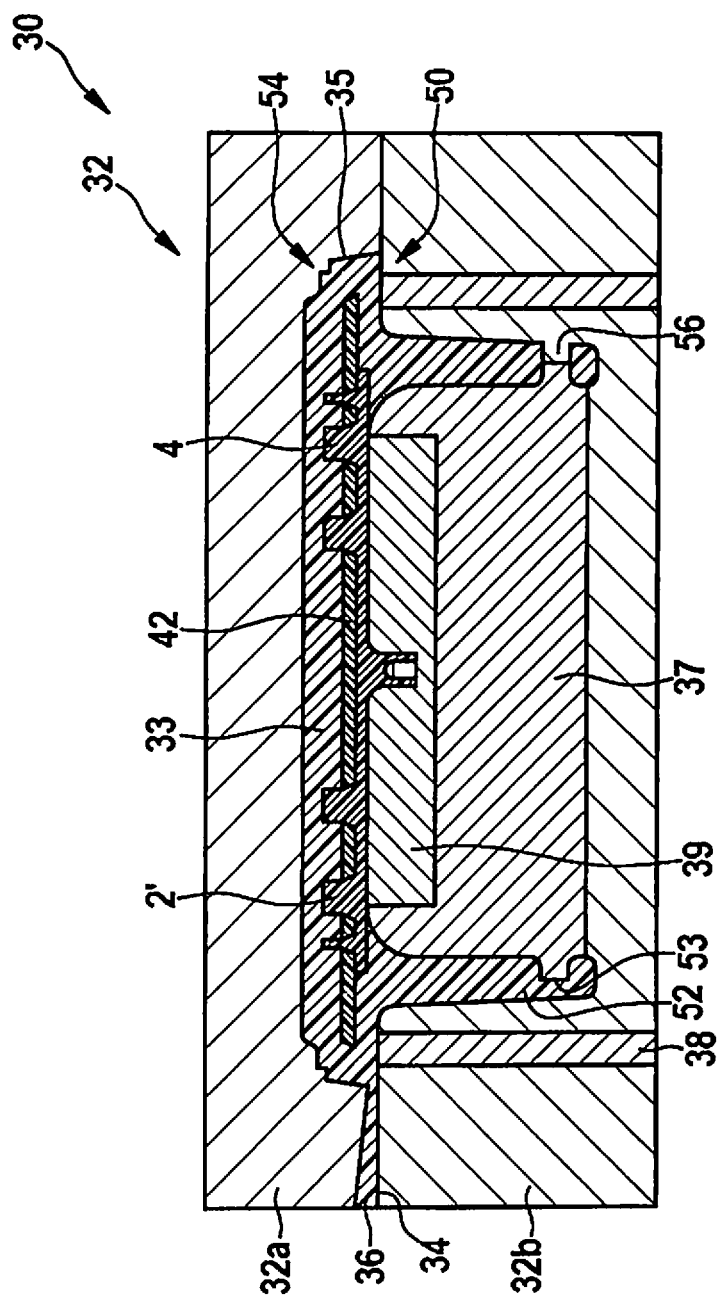
FIG. 3 shows a sectional side view of a third injection mold with a cross pusher and a Teflon insert, including a packet that is situated therein and made up of the three-dimensional structure with the optical conductor and cover element with the contour of the three-dimensional structure left open, produced according to one further variant of the present method.
Figure 4:
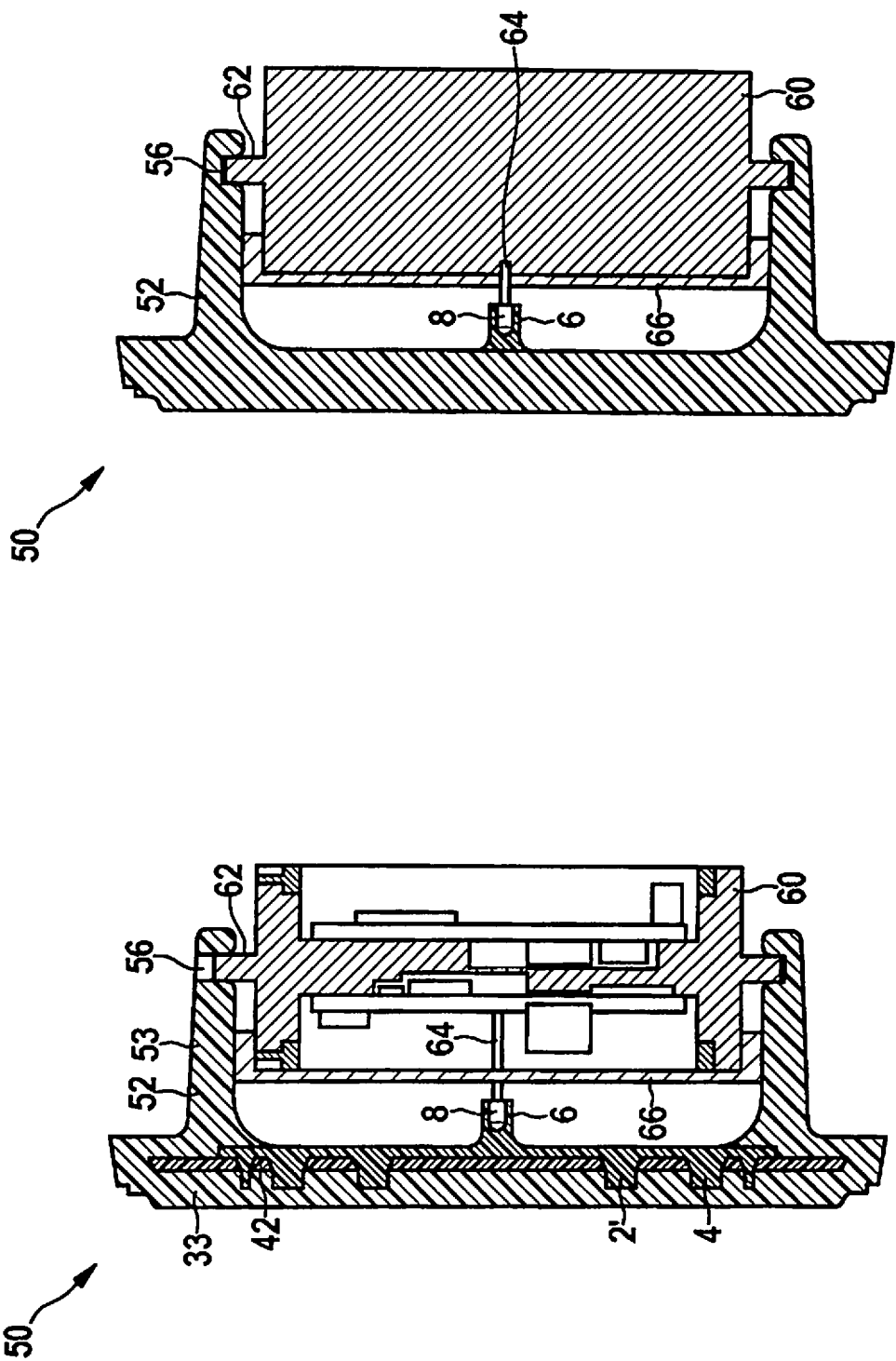
FIG. 4a, b show a sectional side view (FIG. 4a) and a planar side view (FIG. 4b) of the component produced by the production steps of the present method, including the radar module and light sources situated thereon.

FIG. 3 shows third injection mold 30 for embedding three-dimensional structure 2', which is now metallized following a metallization process (not shown further), together with cover element 42 disposed thereon, in a varnish layer 33 as the third plastic material with the aid of a third injection mold 30. At the same time, a mount 52 for a standardized radar module 60 is molded, which is not shown in FIG. 3, as are a plurality of fastening points 54 on molded component 50. It can be seen that the combined packet of metallized three-dimensional structure 2' and cover element 42 disposed thereon is completely embedded in a varnish layer 33. Furthermore, it can be gathered that a mold cavity 35 on gating side 32*a* of casting mold 32 of the third injection-molding process accommodates the raised regions of said packet. In contrast to the first two casting molds 12, 22, gating 36 runs parallel, rather than transversely, to separation plane 34 in the casting mold of FIG. 3. Facing away from separation plane 34, a mount 52 is developed on component 50 produced during the third injection-molding process, which accommodates a radar module 60, which is not visible in FIG. 3. Since mount 52 is provided with undercuts 53, which form a detent groove 56 for the placement of said radar module 60 (not shown in FIG. 3), a cross pusher 37 is provided on casting mold 32, which opens up another unmolding direction on casting mold 32. Cross pusher 37 is provided with a planar Teflon insert 39 on its surface facing said packet. In addition, ejectors 38 are once again visible on ejector side 32*b* of casting mold 32, which engage with the edge regions of component 50 from ejector side 32*b* when casting mold 32 is opened in order to release component 50 from casting mold 32.

FIG. 4*a* shows finished component 50, i.e., 3D radar-module cover 50. In this figure, component 50 is shown in a sectional side view, metallized three-dimensional structure 2' including optical conductor 4 together with cover element 42 being embedded in varnish layer 33, and radar module 60 being disposed on component 50, while FIG. 4*b* shows component 50 only in a side view. The latter view shows radar module 60 with an additional protective sealing cap 66, as well as with a light-source connection 64, which connects radar module 60 to an LED light source 8 that is situated in receptacle 6 of three-dimensional structure 2'. In addition to the connection to LED light source 8, FIG. 4*a* shows component 50 with the packet of metallized three-dimensional structure 2' and cover element 42 embedded in varnish layer 33. Only in the sectional view of FIG. 4*a* does mount 52 form legs 53, on whose ends detent grooves 56 are disposed as fastening elements, with which locking tabs 62 projecting from a module housing of radar module 60 engage in the position of use. Locking tabs 62 and detent grooves 56 jointly form a fastener.

Figure 5:
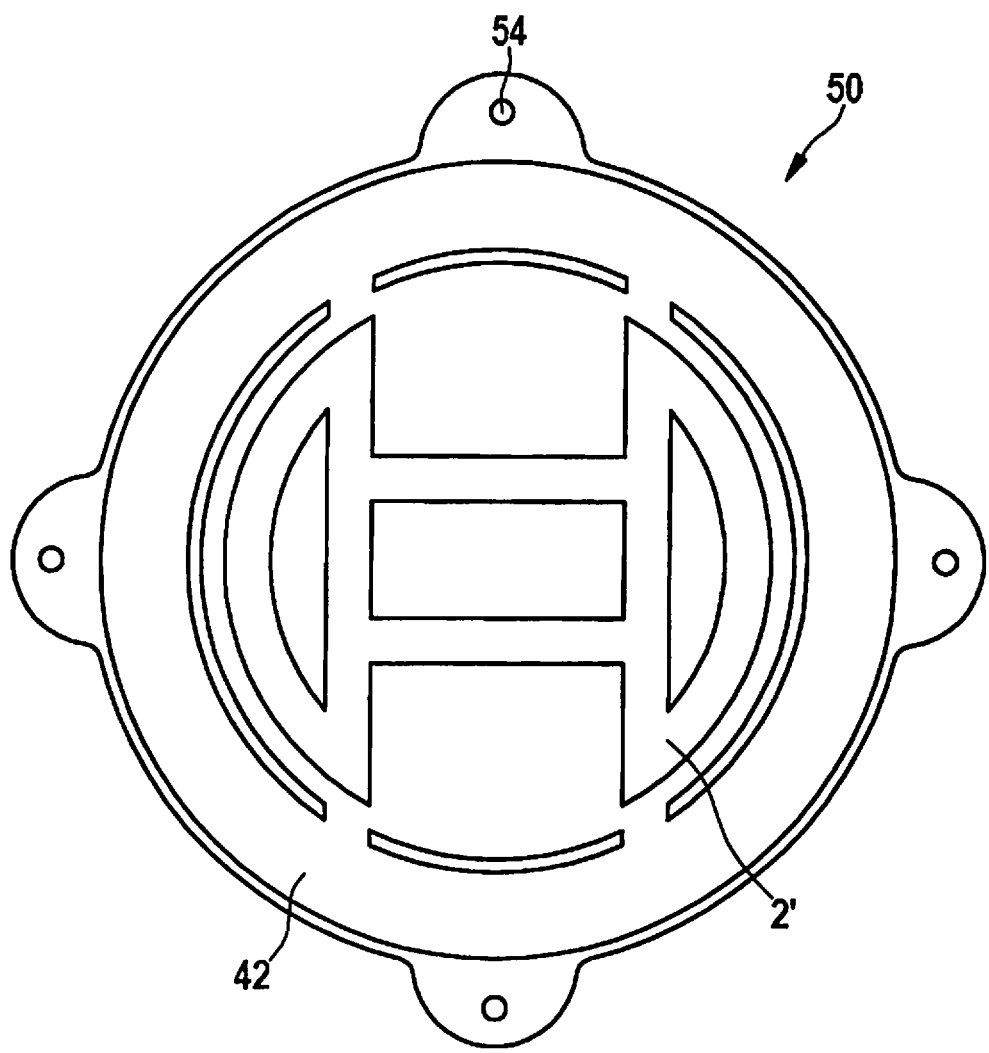
FIG. 5 shows a planar top view of the component from FIG. 4 including fastening points for mounting the component in the area of a radiator grille.

FIG. 5 finally shows the complete component as a 3D radar-module cover 50, generally known as a radome, having a metallized three-dimensional structure 2' including optical conductor 4 with cover element 42 disposed thereon embedded in varnish layer 33. Evenly distributed along the periphery of component 50 on varnish layer 33 are four fastening points 54, by which component 50 is able to be mounted in the region of a radiator grille (not shown) of a motor vehicle.

Accordingly, the present invention described above thus relates to a method and to a system suitable for carrying out the method, each provided to produce a luminescent 3D radar-module cover 50 that is meant to be placed in the area of a radiator grille of a motor vehicle. In separate method steps, a three-dimensional structure 2 including at least one optical conductor 4 and made from a light-dispersing first plastic material is produced with the aid of a first injection mold, and three-dimensional structure 2 is metallized and metal-coated, whereupon gating 16 is severed. Using a second plastic material and a second injection mold 20, a cover element 42 is produced, which at least partially covers the metallized three-dimensional structure in a planar manner in the position of use and on which the contour of three-dimensional structure 2, 2' is left open, whereupon gating 26 is severed. Metallized three-dimensional structure 2', together with cover element 42 disposed thereon, is embedded in a third plastic material with the aid of a third injection mold 30 while a mount 52 for a radar module 60 and a plurality of fastening points 54 are molded on molded component 50 at the same time.

Although the present invention has been described on the basis of preferred exemplary embodiments above, it is not restricted to these exemplary embodiments, but may be modified in a variety of ways. In particular, the present invention is able to be changed or modified in a multitude of ways without departing from the core of the present invention.

What is claimed is:

1. A method for producing a luminescent 3D radar-module cover to be placed in the area of a radiator grille of a motor vehicle, the method comprising:
producing a three-dimensional structure having at least one optical conductor, formed from a light-dispersing first plastic material with a first injection mold;
metallizing and metal-coating the three-dimensional structure with subsequent severing of a gating;
producing a cover element, which at least partially covers the metallized three-dimensional structure in a planar manner in a position of use, and on which the contour of the three-dimensional structure has been left open, from a second plastic material with a second injection mold with subsequent severing of a gating; and
embedding the metallized three-dimensional structure together with the cover element disposed thereon in a third plastic material with a third injection mold while simultaneously molding a mount for a radar module and a plurality of fastening points on the molded component,
wherein the first injection mold includes a casting mold, which is subdivided into a gating side and an ejector side at a separation plane, wherein the gating side includes a rod-shaped gating,
wherein the three-dimensional structure is molded as a molded part in the first injection mold with the rod-shaped gating, which is used as a retainer during the metallization and is mechanically severed from the molded part after the metallization has been finished,
wherein ejectors provide that the three-dimensional structure is releaseable from the ejector side of the casting mold, and wherein along an extension of the rod-shaped gating the first plastic material is injected into the casting mold,
wherein at coverage points, the cover element at least partially covers the three-dimensional structure in the position of use,
wherein the third injection mold is for embedding the three-dimensional structure, which is metallized following a metallization process, together with the cover element disposed thereon, in the third plastic material, wherein the third plastic material is formed by a transparent cross-linking varnish, in which the metallized three-dimensional structure and the cover element disposed thereon are completely embedded, wherein the gating of the first injection mold runs transversely to the separation plane, the gating of the second injection mold runs transversely to a separation plane, and wherein a gating in the third injection mold runs parallel to a separation plane, and wherein the mount includes undercuts, which form a detent groove for placement of the radar module, and wherein the third injection mold includes a cross pusher.

2. The method as recited in claim 1, wherein a transparent thermoplastic plastic material is used as the first plastic material.

3. The method as recited in claim 2, wherein one of a polymethyl methacrylate (PMMA), a polycarbonate (PC) or a polysiloxane is used as the thermoplastic plastic material.

4. The method as recited in claim 1, wherein the three-dimensional structure having the at least one optical conductor is provided and set up with at least one receptacle, on which at least one LED is disposed and connected to the optical conductor in the position of use.

5. The method as recited in claim 1, wherein the three-dimensional structure is metallized using a metal that is transparent to radar waves, using one of indium, tin or gold.

6. The method as recited in claim 1, wherein a layer of evaporated metal, whose thickness is between 20 and 50 nm, is applied on the three-dimensional structure.

7. The method as recited in claim 1, wherein the cover element is produced in the second injection mold from a thermoplastic plastic material, the thermoplastic plastic material being one of PMMA, or a polymer blend.

8. The method as recited in claim 7, wherein the polymer blend is formed by a blend of a polycarbonate together with a thermoplastic terpolymer, the terpolymer being an acrylonitrile butadiene styrole copolymer, or together with a polyester, the polyester being polybutylene terephthalate.

9. The method as recited in claim 1, wherein a molten mass of the plastic material used for producing the cover element is dyed using at least one dye that is transparent to radar waves, the dye being color pigments.

10. The method as recited in claim 1, wherein the pusher is set up on the third injection mold during the embedding in the third plastic material, on whose surface region facing the metallized three-dimensional structure a thermoplastic polymer is placed, the thermoplastic polymer being a layer or an insert of PTFE.

11. The method as recited in claim 1, wherein the cross-linking varnish is formed by a transparent synthetic resin, the transparent synthetic resin being one of polyurethane, an elastomer, or polyuria.

12. The method as recited in claim 1, wherein the cross-linking varnish is injected into the third injection mold at an internal mold pressure that is less than 50 bar.

13. The method as recited in claim 1, wherein the third plastic material cross-links at a mold temperature in a range between 70° C. and 100° C.

14. The method as recited in claim 1, wherein the mount is molded during the embedding, on which the radar module is disposed and reversibly connected to and retained by the finished component with the aid of a snap-lock connection.

15. The method as recited in claim 1, wherein, after the radar module and at least one light source have been placed, the produced component is mounted in the area of the radiator grille using the fastening points provided on the component.

* * * * *